April 25, 1939.  R. L. LEVY  2,155,605
SHOCK ABSORBER PROVIDED WITH A STRESS LIMITING DEVICE
Filed Jan. 30, 1937
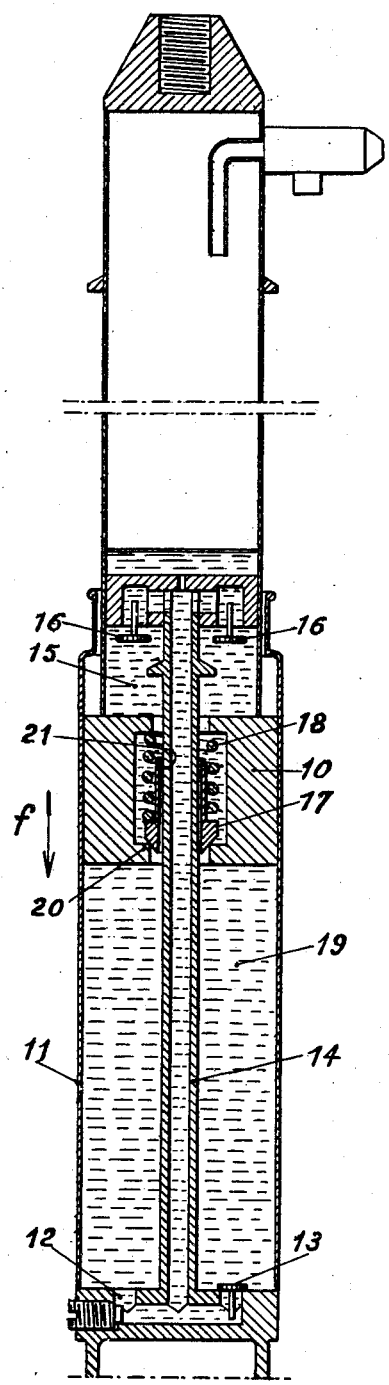

Patented Apr. 25, 1939

2,155,605

UNITED STATES PATENT OFFICE 2,155,605

SHOCK ABSORBER PROVIDED WITH A STRESS LIMITING DEVICE

René Lucien Levy, Montrouge, France, assignor to Société d'Inventions Aeronautiques et Mécaniques S. I. A. M., Fribourg, Switzerland Application January 30, 1937, Serial No. 123,264
In France February 24, 1936

3 Claims. (Cl. 267—64)

The present invention relates to shock absorbers and more particularly pertains to hydraulic shock cushioning devices for use in connection with airplanes.

Numerous known shock absorbers are based on a principle of operation which consists in varying, during the stroke of a piston, the section of the passageway for a fluid, either by means of a rod of variable cross section, passing through an opening or constant diameter in a diaphragm or by grooves provided in a piston rod, or by any other suitable means.

Shock absorbers of this type, judiciously devised provide for the absorption of energy.

It is however to be noted that the result obtained from such devices depends on the relative speed imparted, at the time of operation, to the movable element of the shock absorber relatively to the fixed element. In case the shock absorber is fitted on an aircraft, for instance on the landing chassis of an airplane, the results obtained essentially depend on the vertical speed of fall upon landing. For instance, with a given shock absorber, constructed and adjusted to be responsive to a speed of fall of about 3 meters per second, one result would be obtained, whereas, for the same adjustment, a speed of fall in the order of 3 meters 50 per second would provide a different result.

In the past, the shock absorbing devices in use in aviation did not have these inconveniences, as airplanes landed substantially at the maximum vertical speed possible and the shock absorbers were devised and adjusted for this speed.

Now the landing speeds of airplanes vary.

Consequently, by adjusting the shock absorber in the usual manner, there is a risk of the plane being insufficiently cushioned when rolling on the ground or flying off.

The present invention is adaptable to any type of oleo-pneumatic shock absorber and includes, a stress limiting device which prevents the absorption of energy from rising above a value determined by the manufacturer.

The single figure of the drawing diagrammatically illustrates the application of the invention to a shock absorber of a type similar to that forming the subject-matter of the French Patent No. 783,131, of December 1934.

Referring to this figure, it will be seen that, when the piston 10 moves in a cylinder 11, in the direction of the arrow f, the shock absorbing effect occurs when the liquid passes through the narrow orifice 12, the valve 13 being closed. The liquid delivered passes in a conduit 14, into a compartment 15, through valves 16, which are open. According to the invention, a valve 17 loaded with a spring 18, is fitted in the piston 10 about the tube 14.

If the pressure in the compartment 19 exceeds a definite value the valve 17 is pushed back, and moves away from its seat 20 and offers to the liquid, through the piston, an additional passageway. Upon return movement of the piston 10, the liquid in compartment 15 passes into compartment 19 through a groove 21 formed in the periphery of the tube 14.

The above described embodiment is given by way of example only, as it will be understood that the invention can be carried out in various manners according to the type of shock absorber to which it will be applied.

What I claim as my invention and desire to secure by Letters Patent is:

1. In a shock absorber for the landing chassis of airplanes, a cylinder, a piston movably mounted in said cylinder in response to the force to be cushioned and providing a compartment on each side of the piston, said piston having a central opening, liquid in said compartments, a conduit fixed to the base of said cylinder and extending through said piston, said conduit having a passage so as to provide an opening communicating from the first compartment into the interior of said conduit so that relative movement of said piston towards the base of said cylinder will be cushioned by the liquid passing from the first compartment through said passage, a valve arranged in the opening of said piston embracing said conduit, yieldable means urging said valve to a position to normally close the opening in said piston, the force of said yieldable means being such that the valve is opened to provide an additional passage for the liquid from the first compartment only when the pressure therein reaches a predetermined value, and said conduit having a longitudinally extending groove of smaller area than either of said passages to permit return of the liquid to the first compartment on the re-bound movement of the piston.

2. In a shock absorber for the landing chassis of airplanes, a cylinder, a piston movably mounted in said cylinder in response to the force to be cushioned and providing a compartment on each side of the piston, liquid in said compartments, means having a first system of orifices to permit liquid to be delivered from the first compartment during relative movement of the piston to provide a compression stroke in the first compartment, means providing a second system of orifices for permitting the liquid to be delivered from the second compartment during opposite movement of the piston, said second system of orifices having a unit area of passage smaller than that of the first system of orifices, a valve adapted to be opened only during the first mentioned movement of the piston so that an additional opening is provided to permit liquid from the first compartment to pass therefrom and yieldable means for normally closing said valve during the first movement of the piston but permitting the valve to open when the pressure in the first compartment exceeds a predetermined value.

3. In a shock absorber for the landing chassis of airplanes, a cylinder, a piston movably mounted in said cylinder in response to the force to be cushioned and providing a compartment on each side of the piston, liquid in said compartments, means having a first system of orifices to permit liquid to be delivered from the first compartment during relative movement of the piston to provide a compression stroke in the first compartment, means providing a second system of orifices for permitting the liquid to be delivered from the second compartment during opposite movement of the piston, said second system of orifices having a unit area of passage smaller than that of the first system of orifices, a valve adapted to be opened only during the first mentioned movement of the piston so that an additional opening is provided to permit liquid from the first compartment to pass therefrom, a spring for normally urging said valve to a closed position during the compression of the liquid in the first compartment, and the force of said spring being such that it permits the valve to open when the pressure in the first compartment exceeds a predetermined value.

RENÉ LUCIEN LEVY.